US008836973B2

(12) United States Patent
Yamada

(10) Patent No.: US 8,836,973 B2
(45) Date of Patent: Sep. 16, 2014

(54) PRINT SETTING APPARATUS FOR SETTING PRINT CONDITION

(75) Inventor: Takatsugu Yamada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 248 days.

(21) Appl. No.: 12/948,921

(22) Filed: Nov. 18, 2010

(65) Prior Publication Data

US 2011/0211220 A1 Sep. 1, 2011

(30) Foreign Application Priority Data

Feb. 26, 2010 (JP) ................................ 2010-042453

(51) Int. Cl.

*G06F 15/00* (2006.01)
*G06K 1/00* (2006.01)
*G06F 3/12* (2006.01)
*H04N 1/46* (2006.01)
*G03G 15/00* (2006.01)

(52) U.S. Cl.

CPC .......... *G03G 15/5016* (2013.01); *G03G 15/502* (2013.01); *G03G 2215/00109* (2013.01)
USPC ........... 358/1.15; 358/1.9; 358/1.13; 358/504

(58) Field of Classification Search

None
See application file for complete search history.

(56) References Cited

U.S. PATENT DOCUMENTS 5,933,676 A 8/1999 Ohno
6,970,277 B1 * 11/2005 Makishima .................. 359/238
2002/0044307 A1 * 4/2002 Kise .............................. 358/504
2002/0054383 A1 * 5/2002 Sato et al. ..................... 358/504
2003/0214657 A1 * 11/2003 Stringham .................... 358/1.1

(Continued)

FOREIGN PATENT DOCUMENTS

JP 2000-324279 A 11/2000
JP 2002-296851 A 10/2002

(Continued)

OTHER PUBLICATIONS

Japan Patent Office, Office Action for Japanese Patent Application No. 2010-042453 (counterpart to above-captioned patent application), mailed Jan. 24, 2012.

(Continued)

*Primary Examiner* — Ming Hon
(74) *Attorney, Agent, or Firm* — Merchant & Gould PC

(57) ABSTRACT

A user interface is configured to receive a user instruction when a user sets a print condition for a printer. At least one setting item including a plurality of set contents is set for the print condition. An obtaining unit obtains a status of the printer. Each of the plurality of set contents is a suitable set content suitable for the status of the printer or an unsuitable set content suitable for the status of the printer. A determination unit determines whether a set content set for the one setting item is the suitable set content or the unsuitable set content based on the status of the printer. A control unit executes at least one of a process for restricting the set content, which is determined as the unsuitable set content by the determination unit, from being used for a printing operation and a process for allowing a user to distinguish the set content, which is determined as the unsuitable setting, from another set content in the plurality of set contents which is determined as the suitable set content in the user interface.

11 Claims, 14 Drawing Sheets

(56) References Cited

U.S. PATENT DOCUMENTS

| | | | | |
|---|---|---|---|---|
| 2004/0207862 | A1* | 10/2004 | Such et al. | 358/1.9 |
| 2005/0068566 | A1* | 3/2005 | Nishiguchi | 358/1.15 |
| 2006/0066901 | A1* | 3/2006 | Sugita | 358/1.15 |
| 2006/0245771 | A1* | 11/2006 | Yamada | 399/38 |
| 2010/0157332 | A1* | 6/2010 | Hamada | 358/1.9 |

FOREIGN PATENT DOCUMENTS

| | | | |
|---|---|---|---|
| JP | 2003-103860 | A | 4/2003 |
| JP | 2005-132030 | A | 5/2005 |
| JP | 2005-181534 | A | 7/2005 |
| JP | 2006-162591 | A | 6/2006 |
| JP | 2006-163761 | A | 6/2006 |
| JP | 2009-053832 | A | 3/2009 |

OTHER PUBLICATIONS

European Patent Office, extended European Search Report for European Patent Application No. 10251950.1 (counterpart to above-captioned patent application), dated May 21, 2012.

The State Intellectual Property Office of the People'S Republic of China, Notification of the Second Office Action for Chinese Patent Application No. 201110006083.1 (counterpart to above-captioned patent application), mailed Jul. 25, 2013.

Chinese Office Action issued in CN 201110006083.1, mailed Jan. 10, 2014.

* cited by examiner

FIG.5

| SETTING ITEM | | THE NUMBER OF PRINTED SHEETS | | | | |
|---|---|---|---|---|---|---|
| COLOR/ MONOCHROME | RESOLUTION | 0~9999 | 10000~ 19999 | 20000~ 39999 | 40000~ 49999 | 50000~ |
| MONOCHROME | 600dpi | ○ | ○ | ○ | ○ | × |
| MONOCHROME | 2400dpi | ○ | ○ | ○ | × | × |
| COLOR | 600dpi | ○ | ○ | × | × | × |
| COLOR | 2400dpi | ○ | × | × | × | × |

FIG.12

| SETTING ITEM | ELAPSED TIME (min) | | | | | |
|---|---|---|---|---|---|---|
| MULTIPLE PAGE | 0~299 | 300~999 | 1000~1999 | 2000~3999 | 4000~4999 | 5000~ |
| NORMAL | ○ | ○ | ○ | ○ | ○ | ○ |
| 2 IN 1 | ○ | ○ | ○ | ○ | ○ | × |
| 4 IN 1 | ○ | ○ | ○ | ○ | × | × |
| 9 IN 1 | ○ | ○ | ○ | × | × | × |
| 16 IN 1 | ○ | ○ | × | × | × | × |
| 25 IN 1 | ○ | × | × | × | × | × |

PRINT SETTING APPARATUS FOR SETTING PRINT CONDITION

CROSS REFERENCE TO RELATED APPLICATION

This application claims priority from Japanese Patent Application No. 2010-042453 filed Feb. 26, 2010. The entire content of the priority application is incorporated herein by reference.

TECHNICAL FIELD

The present invention relates to a print setting apparatus, a non-transitory computer readable storage medium storing a set of program instructions installed on and executed by a computer for setting print condition, a print setting method, and a printer. More specifically, the present invention relates to a setting of a print condition for a printer capable of executing a calibration process for print characteristics.

BACKGROUND

In a printer, print characteristics, such as a position and a density of a printed image, is changed due to aging of each component associated with the use of the printer and due to a change in the environment, such as the temperature and the humidity. A calibration process is executed to prevent image quality from degradation caused by the change in the print characteristics. In the calibration process, a predetermined pattern is printed to detect deviations of printing positions and density levels by detecting the predetermined pattern by a sensor and the deviations are calibrated. The printer that executes the above calibration process is disclosed in Japanese Patent Application Publication No. 2002-296851.

SUMMARY

However, in the printer described above, if a status change of the printer, such as the change in the print characteristics, is generated because the calibration process has not been executed for a long time, the deviations of the printing position and the density levels are increased. Hence, it is more likely that a user cannot obtain an image of quality that the user desires. On the other hand, if the calibration processes are frequently executed in the printer, a waiting time for a user is increased and consumption of ink and toner is increased.

In view of the foregoing, it is an object of the present invention to provide a print setting apparatus, a non-transitory computer readable storage medium storing a set of program instructions installed on and executed by a computer for setting print condition, a print setting method, and a printer capable of preventing a printed image from having improper quality.

In order to attain the above and other objects, the present invention provides a print setting apparatus including a user interface, an obtaining unit, a determination unit, and a control unit. The user interface is configured to receive a user instruction when a user sets a print condition for a printer. At least one setting item that includes a plurality of set contents, is set for the print condition. The obtaining unit obtains a status of the printer. Each of the plurality of set contents is a suitable set content suitable for the status of the printer or an unsuitable set content unsuitable for the status of the printer. The determination unit determines whether a set content set for the one setting item is the suitable set content or the unsuitable set content based on the status of the printer. The control unit executes at least one of a process for restricting the set content, which is determined as the unsuitable set content by the determination unit, from being used for a printing operation and a process for allowing a user to distinguish the set content, which is determined as the unsuitable setting, from another set content in the plurality of set contents which is determined as the suitable set content in the user interface.

Another aspect of the present invention, there is provided a non-transitory computer readable storage medium storing a set of program instructions installed on and executed by a computer for setting a print condition for a printer. The printer includes a user interface configured to receive a user instruction when a user sets the print condition. At least one setting item that includes a plurality of set contents, is set for the print condition. The set of program instructions includes: obtaining a status of the printer, each of the plurality of set contents being a suitable set content suitable for the status of the printer or an unsuitable set content unsuitable for the status of the printer; determining whether a set content set for the one setting item is the suitable set content or the unsuitable set content based on the status of the printer; and executing at least one of a process for restricting the set content, which is determined as the unsuitable set content, from being used for a printing operation and a process for allowing a user to distinguish the set content, which is determined as the unsuitable setting, from another set content in the plurality of set contents which is determined as the suitable set content in the user interface.

Another aspect of the present invention, there is provided a print setting method for setting a print condition for a printer including a user interface configured to receive a user instruction when a user sets the print condition. At least one setting item that includes a plurality of set contents, is set for the print condition. The print setting method includes: obtaining a status of the printer, each of the plurality of set contents being a suitable set content suitable for the status of the printer or an unsuitable set content unsuitable for the status of the printer; determining whether a set content set for the one setting item is the suitable set content or the unsuitable set content based on the status of the printer; and executing at least one of a process for restricting the set content, which is determined as the unsuitable set content, from being used for a printing operation and a process for allowing a user to distinguish the set content, which is determined as the unsuitable setting, from another set content in the plurality of set contents which is determined as the suitable set content in the user interface.

Another aspect of the present invention, there is provided a printer including a user interface, a calibration executing unit, an obtaining unit, a determination unit, and a control unit. The user interface is configured to receive a user instruction when a user sets a print condition for a printer. At least one setting item that includes a plurality of set contents, is set for the print condition. The calibration executing unit executes a calibration process of print characteristic. The obtaining unit that obtains a status change of the printer after a most recent calibration process was executed. Each of the plurality of set contents is a suitable set content suitable for the status of the printer or an unsuitable set content unsuitable for the status of the printer. The determination unit determines whether a set content set for the one setting item is the suitable set content or the unsuitable set content based on the status change of the printer. The control unit executes at least one of a process for restricting the set content, which is determined as the unsuitable set content by the determination unit, from being used for a printing operation and a process for allowing a user to distinguish the set content, which is determined as the unsuitable setting, from another set content in the plurality of set contents which is determined as the suitable set content in the user interface.

BRIEF DESCRIPTION OF THE DRAWINGS

The particular features and advantages of the invention as well as other objects will become apparent from the following description taken in connection with the accompanying drawings, in which:

FIG. 5 is a table showing a relationship between a set content of each setting item and the number of sheets that is used in the printer, and suitability determination results according to the first embodiment;

FIG. 12 is a table showing a relationship between set contents of a multiple page printing function and elapsed times, and suitability determination results according to the second embodiment;

DETAILED DESCRIPTION

Figure 1:
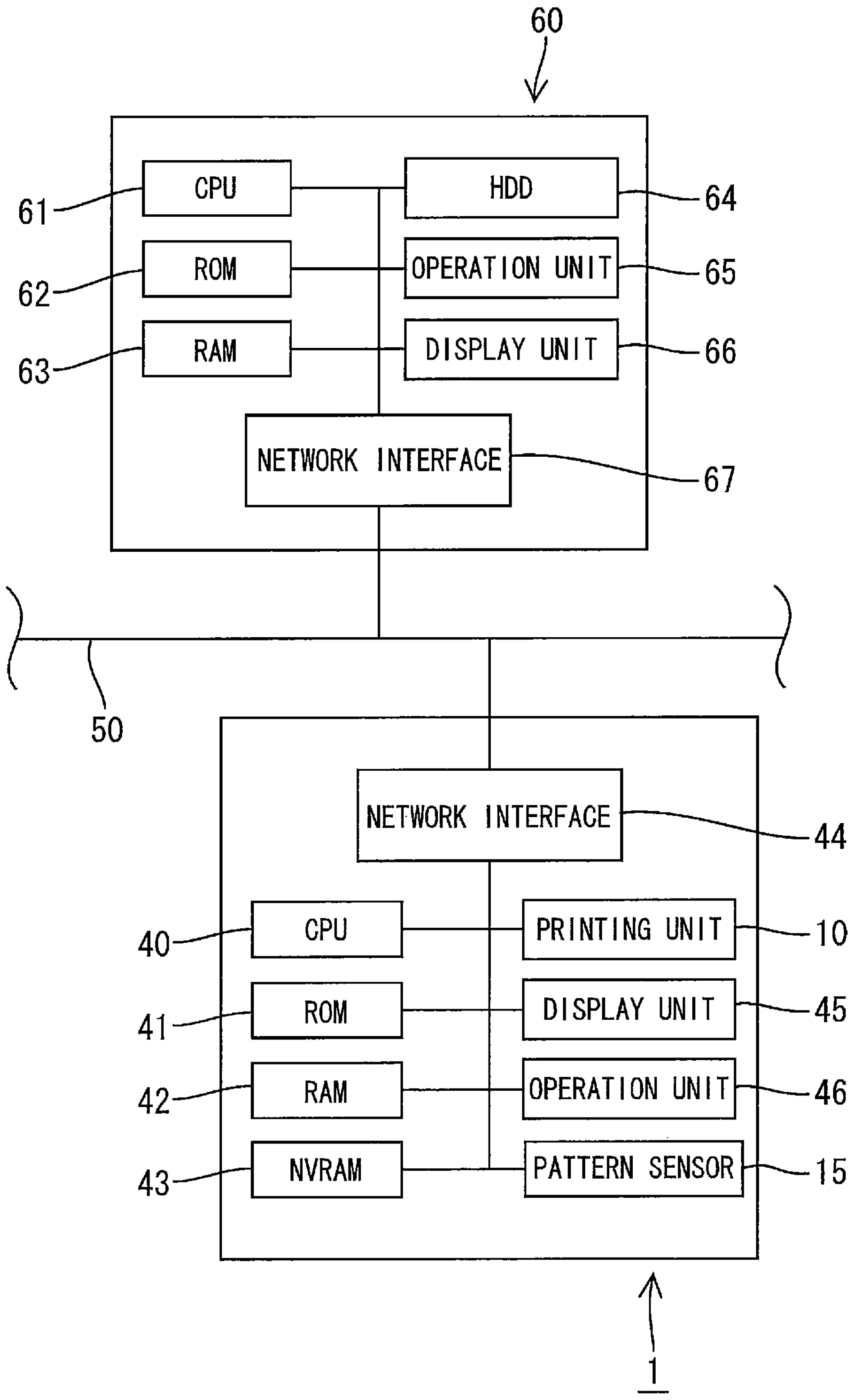
FIG. 1 is a block diagram showing electrical configuration of a printing system including a printer and a computer according to a first embodiment of the present invention.

A print setting apparatus according to embodiments of the present invention will be described while referring to the accompanying drawings wherein like parts and components are designated by the same reference numerals to avoid duplicating description.

First Embodiment

General Configuration of Printer

As shown in FIG. 1, a printing system includes a printer 1 and a computer 60 connected thereto. The printer 1 according to the first embodiment is a direct-tandem-type color printer for forming color images with toner (print agent) of four colors (black, yellow, magenta, and cyan). Note that some reference numerals denoting components identical for each color are omitted in FIG. 1. Throughout the specification, the terms “above,” “below,” “left,” “front,” “rear” and the like will be used assuming that the printer 1 is disposed in an orientation in which it is intended to be used. More specifically, in FIG. 2. a left side and a right side are a front side and a rear side, respectively.

Figure 2:
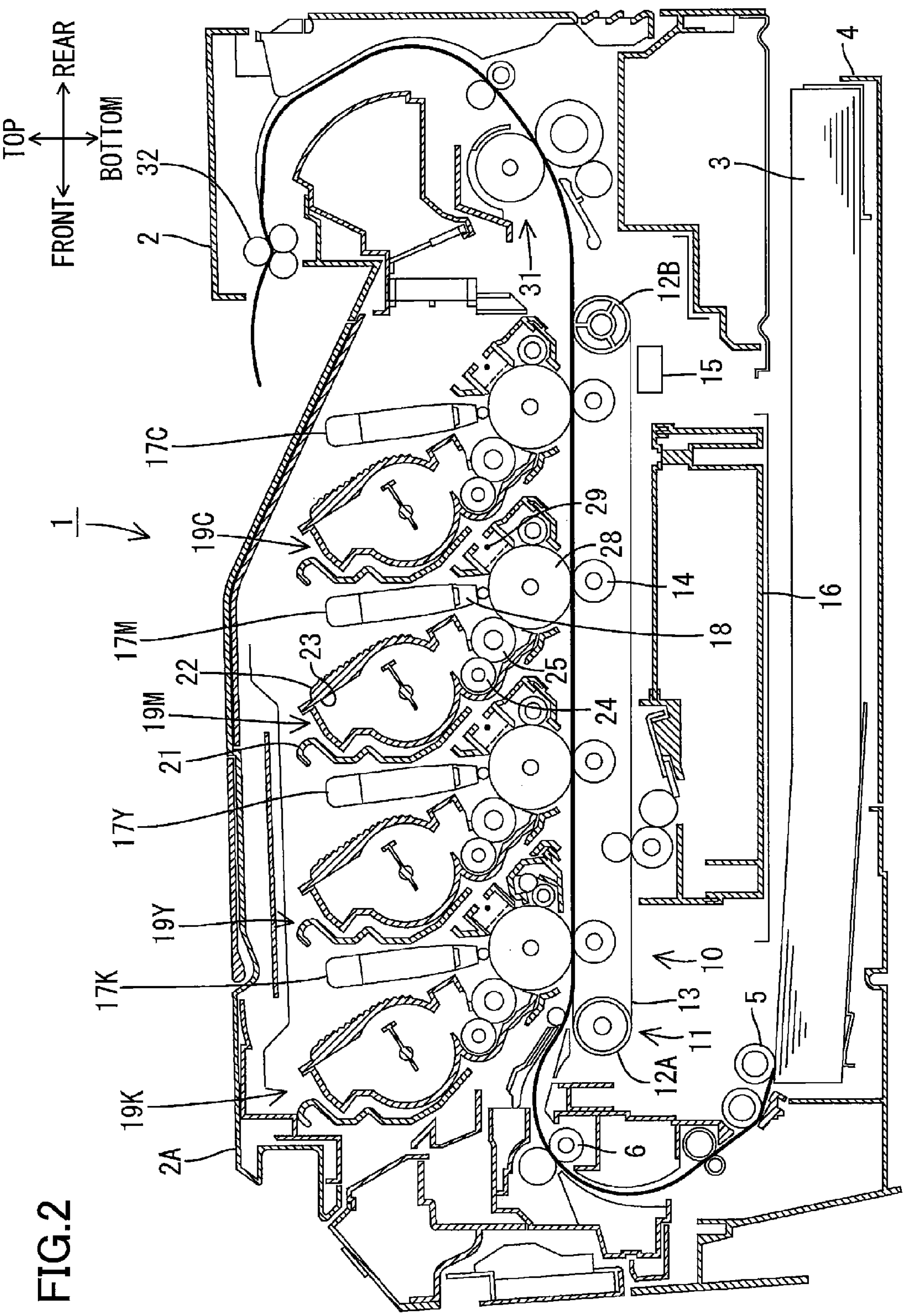
FIG. 2 is a schematic cross-sectional view of the printer according to the first embodiment.

As shown in FIG. 2, the printer 1 includes a main casing 2 formed with a cover 2A on a top surface thereof. The cover 2A is movable between an open position and a closed position. The printer 1 also includes a supply tray 4, a sheet-feed roller 5, registration rollers 6, and a printing unit 10. The printing unit 10 includes a belt unit 11, exposure units 17K, 17Y, 17M, and 17C, process units 19K, 19Y, 19M, and 19C, and a fixing unit 31.

The supply tray 4 is disposed in the bottom section of the main casing 2 for accommodating a stack of sheets 3 (recording medium). The sheets 3 stacked in the supply tray 4 are fed by the sheet-feed roller 5 and conveyed to the belt unit 11 by the registration rollers 6. The sheet-feed roller 5 feeds the sheets 3 one sheet at a time.

The belt unit 11 includes a pair of belt-support rollers 12A and 12B opposing each other in a front-to-rear direction and a ring-shaped belt 13 wound about and spanning between the belt-support rollers 12A and 12B. The belt 13 supports the sheet 3 thereon by electrostatic adsorption, and circulation of the belt 13 conveys the sheet 3 rearward. Four transfer rollers 14 are disposed within the belt 13 at positions confronting photosensitive drums 28 (described later) of the process units 19K, 19Y, 19M, and 19C with an upper part of the belt 13 interposed therebetween.

The exposure units 17K, 17Y, 17M, and 17C respectively correspond to colors black, yellow, magenta, and cyan, and each includes an LED head 18 having an array of a plurality of LEDs (not shown) at the bottom position thereof. Each of the exposure units 17K, 17Y, 17M, and 17C emits a light beam with each LED based on print data and scans the light beam across a surface of the corresponding photosensitive drum 28 one line at a time.

The printer 1 further includes a pair of pattern sensors 15 and a cleaner 16. The pattern sensor 15 is disposed beneath the belt 13 for detecting patterns formed on the surface of the belt 13. Each of the pattern sensors 15 irradiates a light onto the surface of the belt 13, receives reflected light with a phototransistor or the like, and outputs a single of a level corresponding to a received amount of the reflected light. The cleaner 16 is disposed beneath the belt unit 11 for collecting toner, paper dust, and the like clinging on the surface of the belt 13.

The process units 19K, 19Y, 19M, and 19C respectively correspond to colors black, yellow, magenta, and cyan, and each includes a frame 21 and a developing cartridge 22. When the cover 2A is moved to the open position, the exposure units 17K, 17Y, 17M, and 17C are moved upward in association with the movement of the cover 2A, thereby allowing each of the process units 19K, 19Y, 19M, and 19C to be moved or mounted from or into the main casing 2 individually. Also, the belt unit 11 can be mounted into or removed from the main casing 2 when all of the process units 19K, 19Y, 19M, and 19C are removed from the main casing 2.

Each developing cartridge 22 includes a toner chamber 23, a supply roller 24, and a developing roller 25. The toner chamber 23 accommodates toner of a corresponding color. Toner discharged from the toner chamber 23 is supplied to the developing roller 25 by rotation of the supply roller 24, and is tribocharged to a positive polarity at a position between the supply roller 24 and the developing roller 25.

The photosensitive drum 28 and a charger 29 are disposed in the lower section of each frame 21. The photosensitive drum 28 is electrically-grounded and has a column-shaped main body having a surface coated with a positively-chargeable photosensitive layer. The charger 29 generates discharge so that the surface of the rotating photosensitive drum 28 is uniformly charged to have a positive polarity while rotating. This uniformly charged surface of the photosensitive drum 28 is exposed to a scanning of the light beam emitted from the exposure unit 17K, 17Y, 17M, or 17C. As a result, the surface electric potential of the photosensitive drum 28 is partially decreased by an amount corresponding to the intensity of the light beam. Hence, an electrostatic latent image corresponding to an image to be formed on the sheet 3 is formed on the photosensitive drum 28.

Then, positively-charged toner held on the developing roller 25 is supplied to the electrostatic latent image formed on the photosensitive drum 28 by a developing bias applied to the developing roller 25. As a result, the electrostatic latent image on the photosensitive drum 28 is transformed into a visible toner image.

The toner images formed on the photosensitive drums 28 in this manner are sequentially transferred onto the sheet 3 so as to be superimposed over each other by a transfer bias applied to the transfer rollers 14 when the sheet 3 passes through transfer positions between the photosensitive drums 28 and the transfer rollers 14. The sheet 3 on which the toner images has been formed is conveyed to the fixing unit 31 located in the rear section of the main casing 2. The fixing unit 31 thermally fixes the toner images onto the sheet 3 and discharges the sheet 3 upward. Thereafter, the sheet 3 is discharged onto a top surface of the main casing 2 by discharge rollers 32.

(Electrical Configuration of Printer and Computer)

As shown in FIG. 1, the printer 1 further includes a CPU 40, a ROM 41, a RAM 42, a non-volatile RAM (NVRAM) 43, and a network interface 44. The ROM 41 stores various programs for executing various operations in the printer 1. The CPU 40 controls each component of the printer 1 based on programs read from the ROM 41 while storing processed results into either the RAM 42 or the NVRAM 43. The network interface 44 (a specifying unit, an input unit, and an accepting unit) is connected to an external computer 60 and the like through a communication circuit 50, such as LAN, to establish data communication therebetween.

The printer 1 also includes a display unit 45 and an operation unit 46. Although not shown in the drawings, the display unit 45 includes a display panel and a lamp, and is capable of displaying various setting screens and operation status of the printer 1. The operation unit 46 includes various buttons (not shown) through which a user can input various instructions.

The computer 60 includes a CPU 61, a ROM 62, a RAM 63, a hard disk drive (HDD) 64, an operation unit 65, a display unit 66 and a network interface 67. The ROM 62 stores Basic Input/Output System (BIOS) or the like. The HDD 64 stores various programs including application software capable of creating image data to be printed and a printer driver for setting a print condition for the printer 1. The CPU 61 performs control of the computer 60 based on programs read from either the ROM 62 or the HDD 64 while storing processed results into either the RAM 63 or the HDD 64.

The operating unit 65 includes a keyboard of buttons and a pointing device through which the use can input various instructions. The display unit 66 includes a display panel capable of displaying various setting screens. When executing a print setting process described later, the operating unit 65 and display unit 66 are used as a user interface for receiving user's instructions interactively. The network interface 67 is connected to the communication circuit 50 to establish data communication with the printer 1. Note that a plurality of printers (not shown) other than the printer 1 can be connected to the communication circuit 50, and the computer 60 is capable of communicating with the plurality of printers through the network interface 67.

(Print Instruction Operation)

Next, an operation for instructing a print operation from the computer 60 to the printer 1 will be described.

Figure 3:
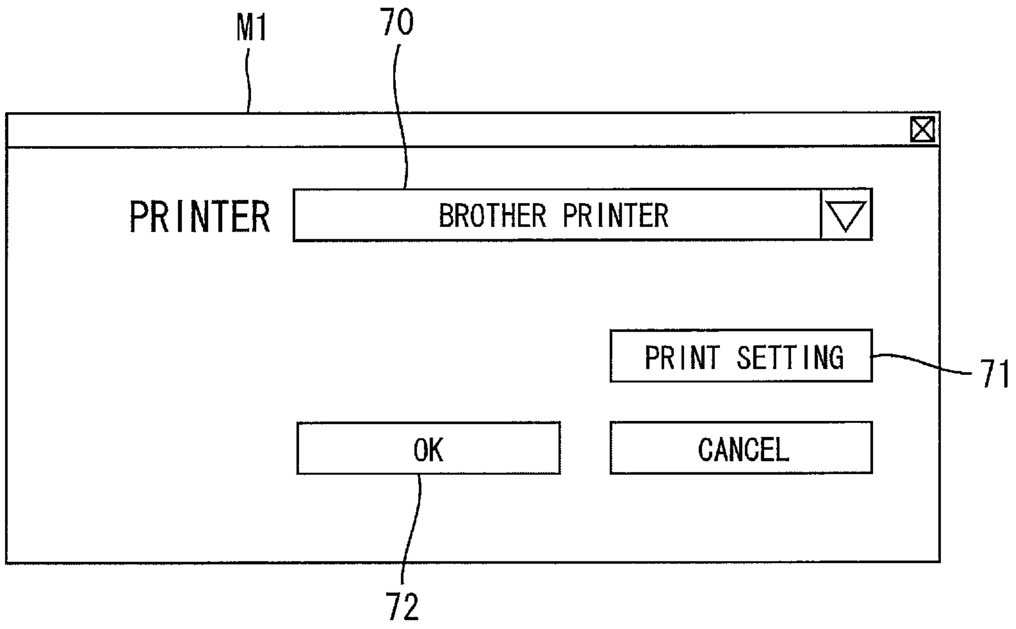
FIG. 3 is an explanatory diagram showing a print instruction screen according to the first embodiment.

When a user activates an application software for handling images or documents in the computer 60 to input a print instruction for forming an image, the CPU 61 displays a print instruction screen M1 on the display unit 66 as shown in FIG. 3. The print instruction screen M1 includes a printer selecting portion 70, a print setting button 71, OK button 72, and a cancel button.

When the printer selecting portion 70 is clicked through the operation unit 65, the CPU 61 displays a list of a plurality of printer names corresponding to a plurality of printer drivers installed in the computer 60. The user can select, as a printer to be used, one of printer names from the list by the operating unit 65.

Further, when the user clicks the print setting button 71 in the print instruction screen M1, the CPU 61 activates a printer driver corresponding to a printer name selected on the printer selecting portion 70 to execute the print setting process for setting a print condition for a printer corresponding to the printer name selected on the printer selecting portion 70. When the user clicks the OK button 72, the CPU 61 reads image data of a print to be printed to convert the image data into data based on page description language (PDL) or the like. Further, the CPU 61 adds a set content of the print condition to the data based on PDL to create print data and transmits the print data to the printer 1 via the network interface 67.

Upon receiving the print data through the network interface 44, the printer 1 prints the print data according to the set content of the print condition contained in the print data.

(Print Setting Process)

The print setting process is executed on the computer 60 when the user clicks the print setting button 71 while a printer name corresponding to a printer driver (a print setting program) of the printer 1 is selected and displayed on the printer selecting portion 70 in the print instruction screen M1.

Figure 4:
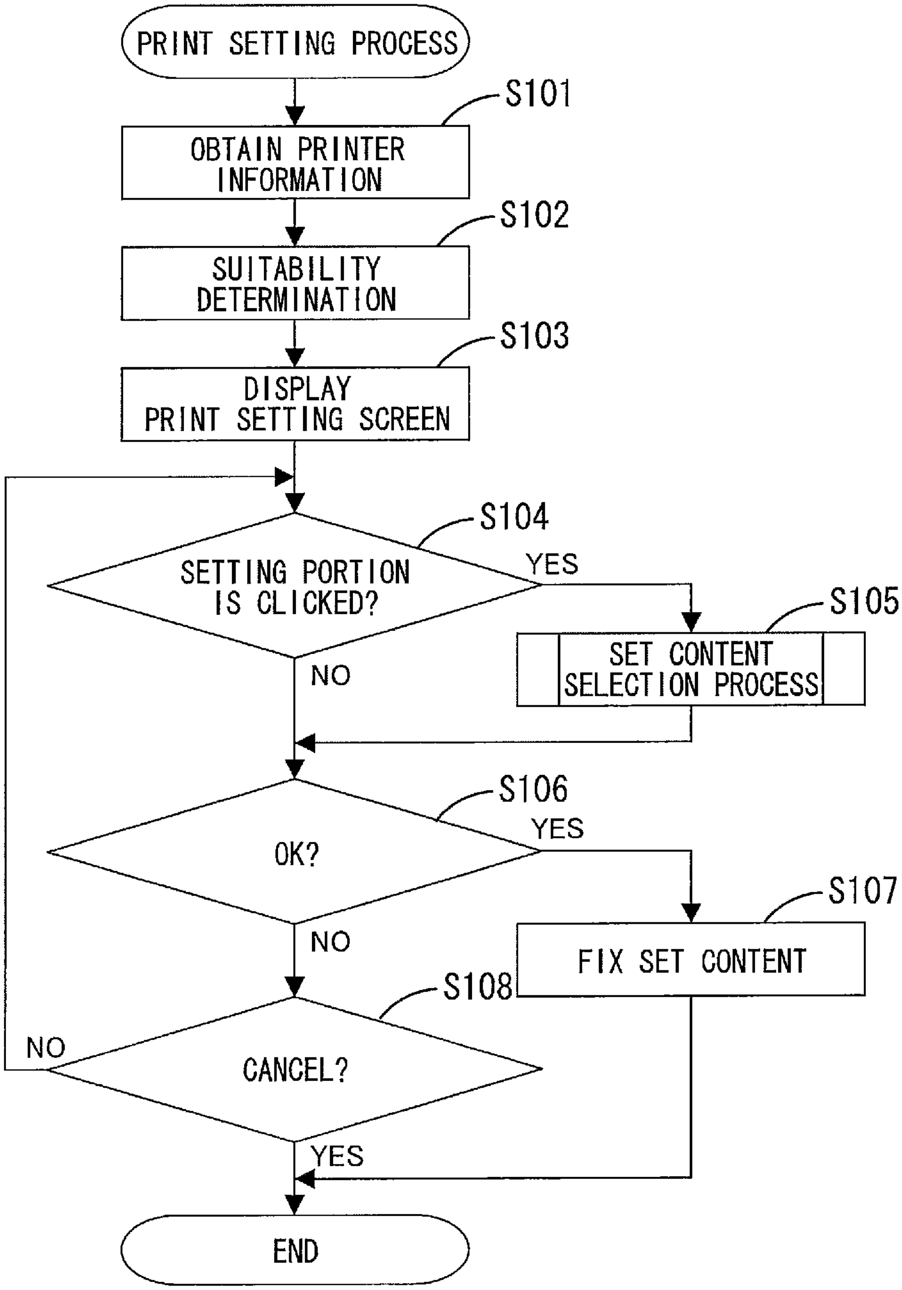
FIG. 4 is a flowchart illustrating steps in a print setting process according to the first embodiment.

Upon staring the print setting process shown in FIG. 4, in S101 the CPU 61 obtains printer information from the printer 1 via the network interface 67. The printer information is information indicating a status change of the printer 1 after a most recent calibration process for print characteristics was executed. Further, the printer information is an indicator for indicating print quality level that can be realized in the printer 1. In this embodiment, the number of sheets that has been printed after the most recent calibration process was executed is used as the printer information. The CPU 40 of the printer 1 counts the number of sheets that is used in each printing operation and stores the counted number in the NVRAM 43. The CPU 40 outputs a total number of sheets used after executing the most recent calibration process upon a request from the computer 60.

As described later, deviations of printing positions and deviations of density levels are measured in the calibration process, and a calibration for an image to be printed is executed based on the measured results. Accordingly, since the deviations of printing positions and density levels are relatively small immediately after the calibration process has been executed, the printer 1 can form high-quality images. As the status change of the printer 1 becomes greater (i.e. the number of sheets used in the printing operations is increased), the deviations of printing positions and density levels are increased. As a result, the print quality level that can be realized in the printer 1 is degraded.

Subsequently, in S102 the CPU 61 of the computer 60 executes a suitability determination based on the obtained printer information. Specifically, in the suitability determination, the CPU 61 determines whether a set content of a specific setting item in a plurality of setting items that the user can set is a suitable set content suitable for a status of the printer 1 or an unsuitable set content unsuitable for the status of the printer 1. The specific setting item has a plurality of set contents that can be set by the user. Each of the set contents of the specific setting item is either the suitable set content suitable for a status of the printer 1 or the unsuitable set content unsuitable for the status of the printer 1. The CPU 61 determines whether the set content of the specific setting item is the suitable set content or the unsuitable set content based on the status of the printer 1.

The set content of the specific setting item used for the suitability determination affects an image quality desired according to a purpose and a type of printed material. In this embodiment, based on two setting items including a color/monochrome and a resolution, the CPU 61 determines whether or not a combination of set contents of the color/monochrome and the resolution is suitable for the status of the printer 1. The color/monochrome setting is a setting that indicates whether an image data to be printed is printed in color or monochrome on the sheet 3. The resolution setting is a setting that indicates a resolution at which the image data to be printed is printed on the sheets 3. In this embodiment, the color/monochrome setting includes "color" and "monochrome" as set contents and the resolution setting includes "600 dpi" and "2400 dpi" as set contents.

When the CPU 61 determines that the combination of the set contents is suitable for the status of the printer 1, the printer 1 is in a state where the printer 1 can print an image on the sheet 3 with quality satisfying the combination of the set contents. On the other hand, when the CPU 61 determines that the combination of the set contents of the printer 1 is unsuitable for the status of the printer 1, the printer 1 is in a state where the printer 1 cannot print an image on the sheet 3 with quality satisfying the combination of the set contents.

FIG. 5 is a table showing a relationship between the set content of each setting item and the number of sheets that is used in the printer 1, and suitability determination results. In FIG. 5, "o" represents that the combination of the set contents of the color/monochrome and the resolution is suitable for the status of the printer 1. On the other hand, "x" represents that the combination of the set contents of the color/monochrome and the resolution is unsuitable for the status of the printer 1. The number of sheets that is used in the printer 1 indicates the number of sheets that has been printed after executing the most recent calibration process.

For example, if the set content of the color/monochrome is "color" and the set content of the resolution is "2400 dpi", it is assumed that the user intends to print color photographs. Hence, it is desirable that the color photographs are printed with a relatively high-quality. For this reason, when the number of sheets that is used in the printer 1 is "0~9999" that is when the number of printed sheet after the pervious calibration process is relatively low, the CPU 61 determines that the combination of the set contents is suitable for the status of the printer 1. On the other hand, when the number of sheets that is used in the printer 1 is greater than or equal to "10000," the CPU 61 determines that the combination of the set contents is unsuitable for the status of the printer 1.

Further, if the set content of the color/monochrome is "monochrome" and the set content of the resolution is "600 dpi", it is assumed that the user intends to print characters and the like. The user is likely to accept the characters printed with a relatively low quality. For this reason, when the number of sheets that is used in the printer 1 reaches "40000~49999" that is the relatively large number of printed sheets after the pervious calibration process, the CPU 61 determines that the combination of the set contents is suitable for the status of the printer 1. On the other hand, when the number of sheets that is used in the printer 1 is greater than or equal to "50000," the CPU 61 determines that the combination of the set contents is unsuitable for the status of the printer 1.

That is, if the set content of the color/monochrome is "color" or the set content of the resolution has a higher value, it is highly possible that the user demands a printed material with relatively high quality. On the contrary, if the set content of the color/monochrome is "monochrome" or the set content of the resolution has a lower value, it is considered that the user accepts the printed material with low quality since the user does not demand the printed material with high quality, or the types and contents of the printed material is unaffected by the deviations of printing positions and density levels.

Figure 6:
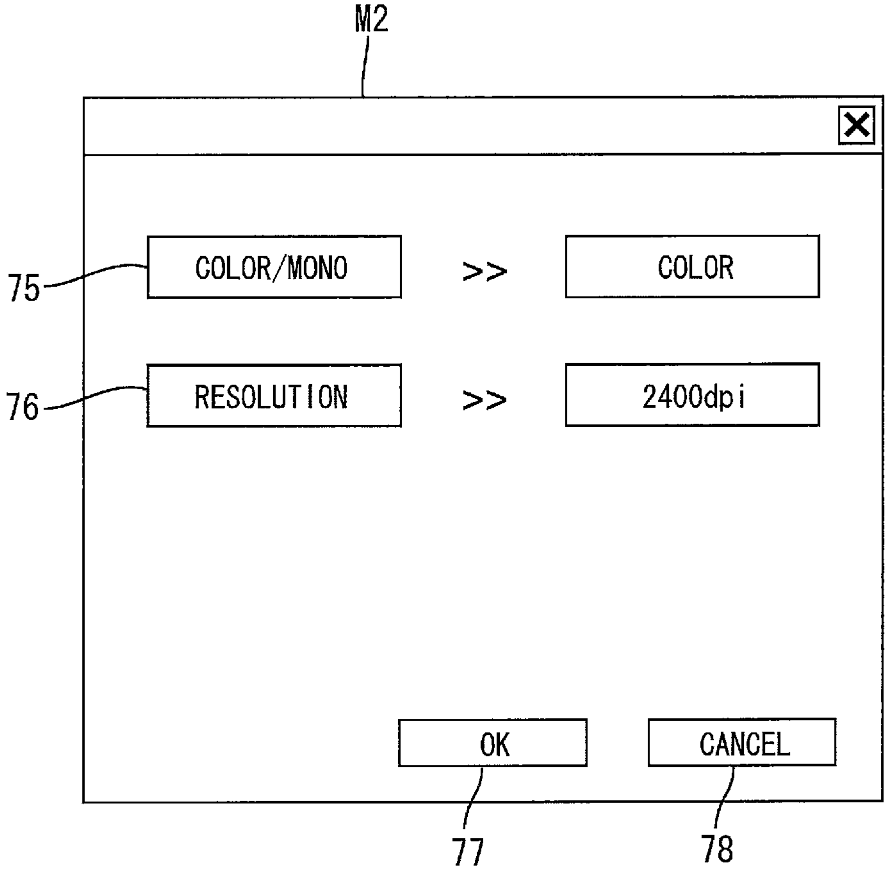
FIG. 6 is an explanatory diagram showing a print setting screen according to the first embodiment.

After executing the suitability determination in S102 of FIG. 5, in S103 the CPU 61 displays a print setting screen M2 shown in FIG. 6 on the display unit 66. The print setting screen M2 includes a color/monochrome setting portion 75 for setting the color/monochrome, a resolution setting portion 76 for setting the resolution, an OK button 77, and a cancel button 78. Note that, the print setting screen M2 may include another setting items not to be used for the suitability determination. For the sake of simplicity, however, the another setting items are omitted.

An initial set content is displayed on each of the color/monochrome setting portion 75 and the resolution setting portion 76. Here, a default set content (or a set content that has already been used for the previous printing operation) is displayed, as the initial set content, on each of the color/monochrome setting portion 75 and the resolution setting portion 76, if the CPU 61 determines that the combination of the default set contents of the color/monochrome setting portion 75 and the resolution setting portion 76 is suitable for the status of the printer 1 in S102.

Here, it is assumed that the default set content of the color/monochrome is "color" and the default set content for the resolution is "2400 dpi". If the CPU 61 determines that the combination of the default set contents is unsuitable for the status of the printer 1 in S102, the CPU 61 changes "color" of the color/monochrome into "monochrome". Then, the CPU 61 determines whether or not the combination of the set contents ("monochrome" and "2400 dpi") is suitable for the status of the printer 1. If the CPU 61 determines that the combination of the set contents ("monochrome" and "2400 dpi") is suitable for the status of the printer 1, the set contents ("monochrome" and "2400 dpi") are displayed on the color/monochrome setting portion 75 and the resolution setting portion 76 as the initial set contents. On the other hand, the CPU 61 determines that the combination of the set contents is unsuitable for the status of the printer 1, the CPU 61 changes "2400 dpi" of the resolution into "600 dpi". That is, the resolution setting is changed to a lower resolution value than that of the default set content. Then, the set contents ("monochrome" and "600 dpi") are displayed on the color/monochrome setting portion 75 and the resolution setting portion 76 as the initial set contents, if the CPU 61 determines that the combination of the set contents ("monochrome" and "600 dpi") is suitable for the status of the printer 1.

Subsequently, in S104 the CPU 61 determines whether or not any one of the setting portions 75 and 76 is clicked. If the CPU 61 determines that one of the setting portions 75 and 76 is clicked (S104: Yes), in S105 the CPU 61 executes a set content selection process corresponding to the clicked setting portion 75 or 76.

In S201 the CPU 61 determines whether or not the set contents corresponding to the setting portion 75 or 76 that has been clicked include an unsuitable set content. Specifically, the CPU 61 determines whether or not the set contents corresponding to the setting portion 75 or 76 that has been clicked includes one set content in which a combination of the one set content and the initial set content corresponding to the remaining setting portion 75 or 76 has been determined unsuitable for the status of the printer 1 in S102.

For example, when the resolution setting portion 76 is clicked while the initial set content of the color/monochrome setting portion 75 is "color", it is determined whether or not the combinations of the selectable set contents ("600 dpi" or "2400 dpi") of the resolution setting and "color" includes a combination that has been determined unsuitable for the status of the printer 1. If the combinations of the selectable set contents of the resolution setting and the "color" do not include the combination that has been determined unsuitable for the status of the printer 1, the CPU 61 determines that the selectable set contents of the resolution setting portion 76 do not includes the unsuitable set content (S201: No). In this case, in S202 the CPU 61 displays the selectable set contents for the resolution setting without restriction. In other words, the CPU 61 displays the set contents in a state such that both of the selectable set contents are selectable by the user.

Figure 8:
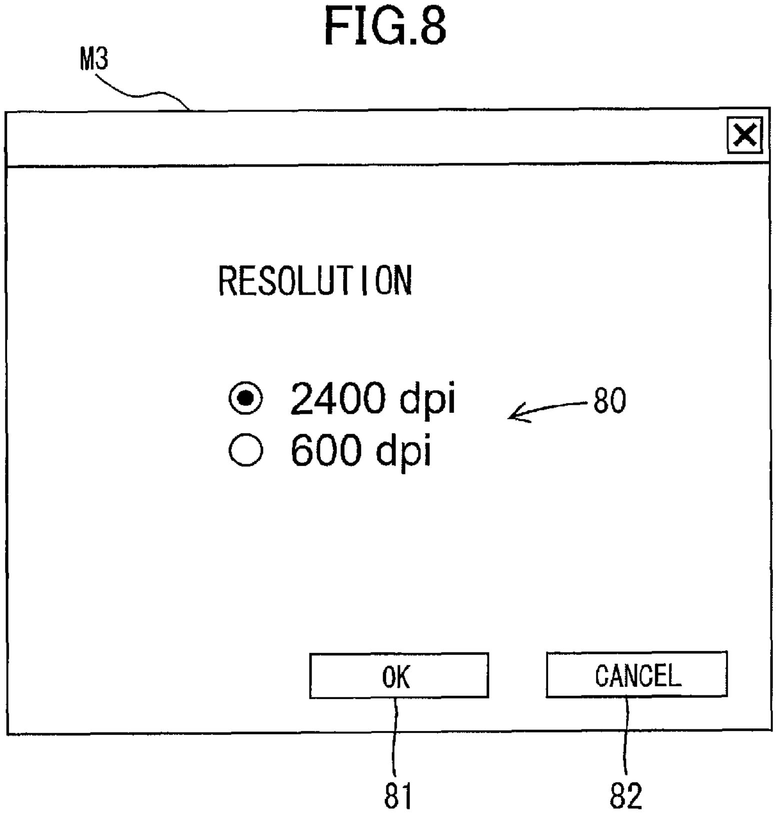
FIG. 8 is an explanatory diagram showing one setting screen according to the first embodiment.

More specifically, when the resolution setting portion 76 is clicked by the user, the CPU 61 displays a selection screen M3 shown in FIG. 8 on the display unit 66. The selection screen M3 includes a selection portion 80, an OK button 81, and a cancel button 82. In the selection portion 80, since all selectable set contents of the resolution setting portion 76 are displayed in a user-selectable state, the user can select one of a "600 dpi" radio button and a "2400 dpi" radio button.

Figure 9:
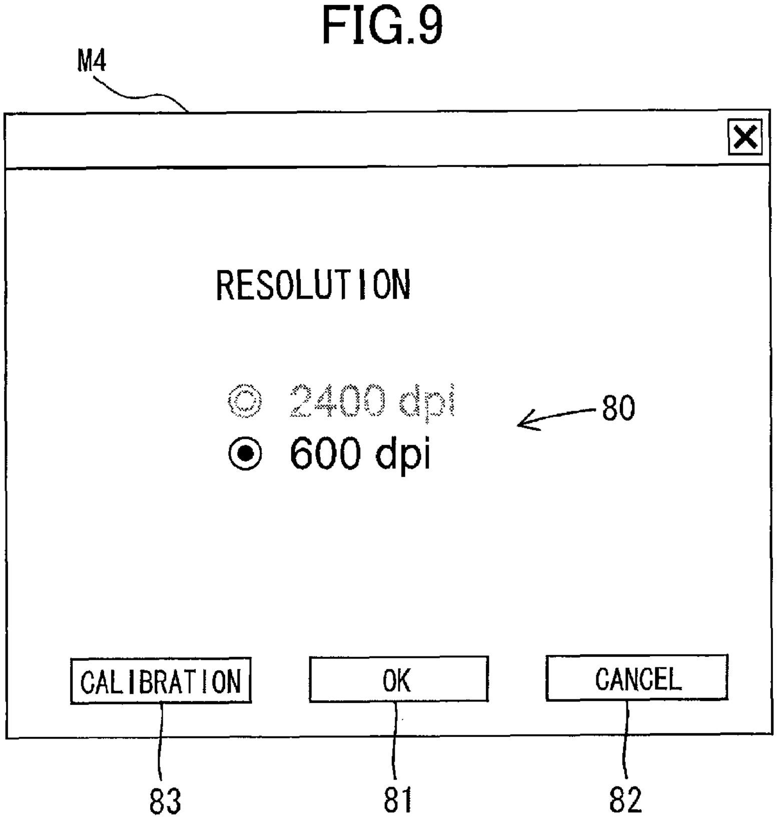
FIG. 9 is an explanatory diagram showing another setting screen according to the first embodiment.

On the other hand, when the CPU 61 determines that the selectable set contents of the setting portion 75 or 76 that has been clicked includes the unsuitable set content (S201: Yes), in S203 the CPU 61 displays the selectable set contents in a state such that one of the selectable set contents is unselectable by the user. More specifically, when the resolution setting portion 76 is clicked by the user, the CPU 61 displays a selection screen M4 shown in FIG. 9 on the display unit 66. The selection screen M4 includes the selection portion 80, the OK button 81, and the cancel button 82, in the same manner as the selection screen M3.

In the selection portion 80 of the selection screen M4, "2400 dpi" (unsuitable set content) is displayed in a user-unselectable state. The CPU 61 restricts "2400 dpi" from being used for a printing operation. That is, the combination of "2400 dpi" and the initial set content of the color/monochrome setting portion 75 is determined unsuitable for the status of the printer 1 by the CPU 61. "2400 dpi" is displayed in grayout and an outlined white circle is displayed in the radio button for "2400 dpi". The unsuitable set content ("2400 dpi") and the suitable set content ("600 dpi") are displayed such that the user can easily identify them. In other words, the CPU 61 allow the user to distinguish the unsuitable set content from the suitable set content in the display unit 65.

The selection screen M4 further includes a calibration button 83 that is not provided in the selection screen M3. When the calibration button 83 is clicked (S204: Yes), in S205 the CPU 61 transmits a calibration execution command to the printer 1 through the network interface 67. Note that, a calibration button may be displayed in the selection screen M3 and displayed in grayout, thereby being in a disabled state by the operating unit 65.

The CPU 40 of the printer 1 executes a calibration process for the print characteristics after receiving the calibration execution command. In this embodiment, a printing position calibration process for correcting positional deviations among images of the four colors formed on the sheet 3 is executed as the calibration process.

Figure 10:
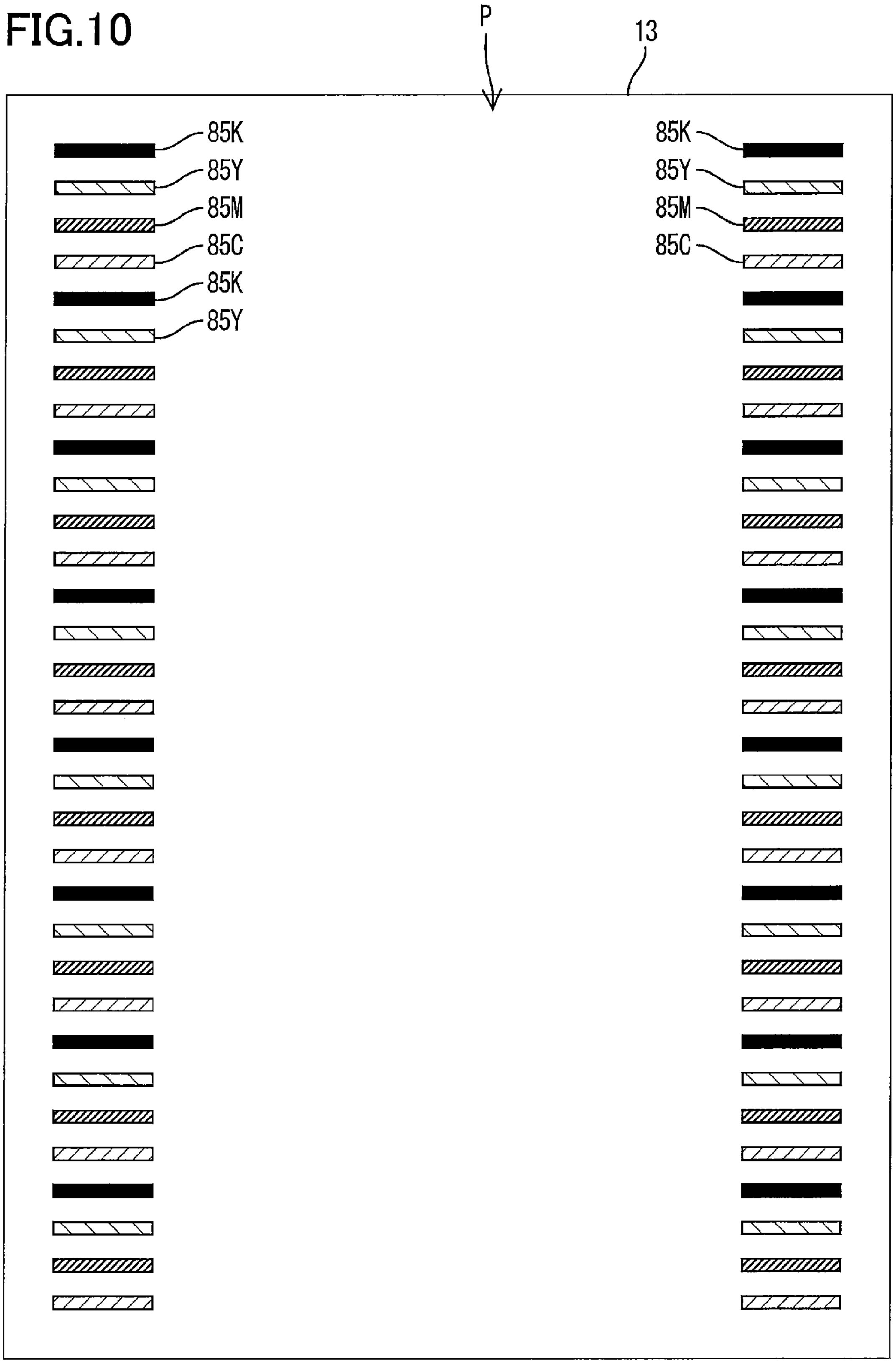
FIG. 10 is a view showing a pattern form on a belt according to the first embodiment.

Upon receipt of the calibration execution command, the CPU 40 forms a pattern P shown in FIG. 10 on the belt 13. The pattern P includes a plurality of marks 85K, 85Y, 85M, and 85C that are juxtaposed with each other in a conveying direction of the belt 13. Each of the marks 85K~85C has rectangular shape elongated in a direction perpendicular to the conveying direction of the belt 13 (a main scanning direction). The four marks 85K~85C are arranged in order of black, yellow, magenta, and cyan as one group. A plurality of groups of the marks 85K~85C are arranged spaced apart from each other in the conveying direction of the belt 13 (a sub-scanning direction).

Subsequently, the CPU 40 detects a timing in which each marks 85K~85C passes a detection position of the pattern sensor 15 and, based on the detection results, calculates positional offset amounts in the sub-scanning direction for the marks 85Y, 85M, and 85C of calibrated colors (yellow, magenta, and cyan) on the basis of the position of the mark 85K. Further, the CPU 40 calculates an average positional offset for each calibrated color based on the detection results of all groups of the marks 85Y~85C, and a position calibration value for compensating the average positional offset for each calibrated color. Then, the CPU 41 stores the position calibration values into the NVRAM 43 and ends the calibration process. At this time, the CPU 41 resets the count of the number of sheets stored in the NVRAM 43 to update the printer information. When printing images, the CPU 40 retrieves the position calibration values from the NVRAM 43 and calibrates the printing positions.

In S206 the CPU 61 of the computer 60 reruns the suitability determination after outputting the calibration execution command. That is, since the status of the printer 1 has been changed by executing the calibration process to improve the image quality that can be realized in the printer 1, the combination of the set contents that has been determined as the unsuitable set content (not to conform to the status of the printer 1) is determined as the suitable set content. Then, the CPU 61 returns to S202 to display the selectable set contents for the resolution setting without restriction. Therefore, since the CPU 61 displays the selectable set contents in the state such that both of the set contents are selectable by the user, the user can select a desired set content.

When the OK button 81 is clicked in the selection screen M3 or M4 (S207: Yes), in S208 the CPU 61 temporarily sets the set contents selected on the selection portion 80 as temporary set contents and ends the set content selection process by closing the selection screen M3 or M4. On the other hand, when the cancel button 82 is clicked (S209: Yes), the CPU 61 ends the set content selection process without changing the initial set contents. Further, when no instruction is inputted with respect to the selection screen M3 or M4 (S204: No, S207: No, and S209: No), the CPU 61 returns to S204 and waits for an instruction to be inputted from the operation unit 65.

After the end of the set content selection process, in S106 the CPU 61 determines whether or not the OK button 77 in the print setting screen M2 is clicked. The CPU 61 determines that the OK button 77 is clicked (S106: Yes), in S107 the CPU 61 fixes the temporary set contents of the setting portions 75 and 76 as fixed set contents and ends the print setting process.

On the other hand, if the cancel button 78 in the print setting screen M2 is clicked (S108: Yes), the CPU 61 ends the print setting process without changing the set contents on the setting portions 75 and 76 displayed in S103. Further, if no operation (instruction) is inputted with respect to the print setting screen M2 (S104: No, S106: No, and S108: No), the CPU 61 returns to S104 and waits for an instruction to be inputted from the operation unit 65.

Effect of this Embodiment

According to the first embodiment described above, the CPU 61 obtains the status change of the printer 1 after the most recent calibration process for the print characteristics was executed, and determines whether the set content is the suitable set content suitable for the status of the printer 1 or the unsuitable set content unsuitable for the status of the printer 1. Then, the CPU 61 executes at least one of a process for restricting the set content, which is determined as the unsuitable set content by the CPU 61, from being used for a printing operation and a process for allowing a user to distinguish the set content, which is determined as the unsuitable set content, from the other set content which is determined as the suitable set content.

According to the purpose and the type of printed material, there is a case where an image with high quality is desired by the user or a case where the user accepts an image with low quality. Hence, desired image quality can be achieved by the set contents. On the other hand, by obtaining the status change of the printer 1 after the most recent calibration process was executed, a quality of an image to be formed by the printer 1 from which the status change has bee obtained can be estimated.

The CPU 61 determines whether or not the combination of the set contents conforms to the stats change of the printer 1 and executes at least one of a process for restricting the set content, which is determined as the unsuitable set content by the CPU 61, from being used for a printing operation and a process for allowing a user to distinguish the set content, which is determined as the unsuitable setting, from the other set content which is determined as the suitable set content. Hence, a printed image with improper quality can be avoided.

If the CPU 61 determines that the set content is the unsuitable set content, the CPU 61 allows the user to input the calibration execution command through the operation unit 65 when the user sets the print condition. Accordingly, since the calibration process is executed in the printer 1 as required when the user sets the print condition, a quality of an image can be maintained.

When the calibration process is executed in the printer 1, the CPU 61 changes the determination of the set content from the unsuitable set content to the suitable set content. Therefore, the suitability determination is executed appropriately depending on the status change of the printer 1.

The CPU 61 determines whether or not the combination of the set contents (color/monochrome and resolution) conforms to the status change of the printer 1. That is, instead of performing the suitability determination based on a set content of a single setting item, the suitability determination is performed based on a combination of set contents of a plurality of setting items. Therefore, the suitability determination is executed more appropriately.

The set content having higher resolution in the plurality of set contents for the resolution setting is easily determined as the unsuitable set content. That is, if the set content having higher resolution is selected, it is likely that an image with high quality is desired by the user, compared to a case where another set content having lower resolution is selected. If the another set content having lower resolution is selected, it is likely that the user accepts an image with low quality. Therefore, the set content having higher resolution in the plurality of set contents is preferentially determined as the unsuitable set content by the CPU 61, a printed image with improper quality can be avoided.

Second Embodiment

Figure 11:
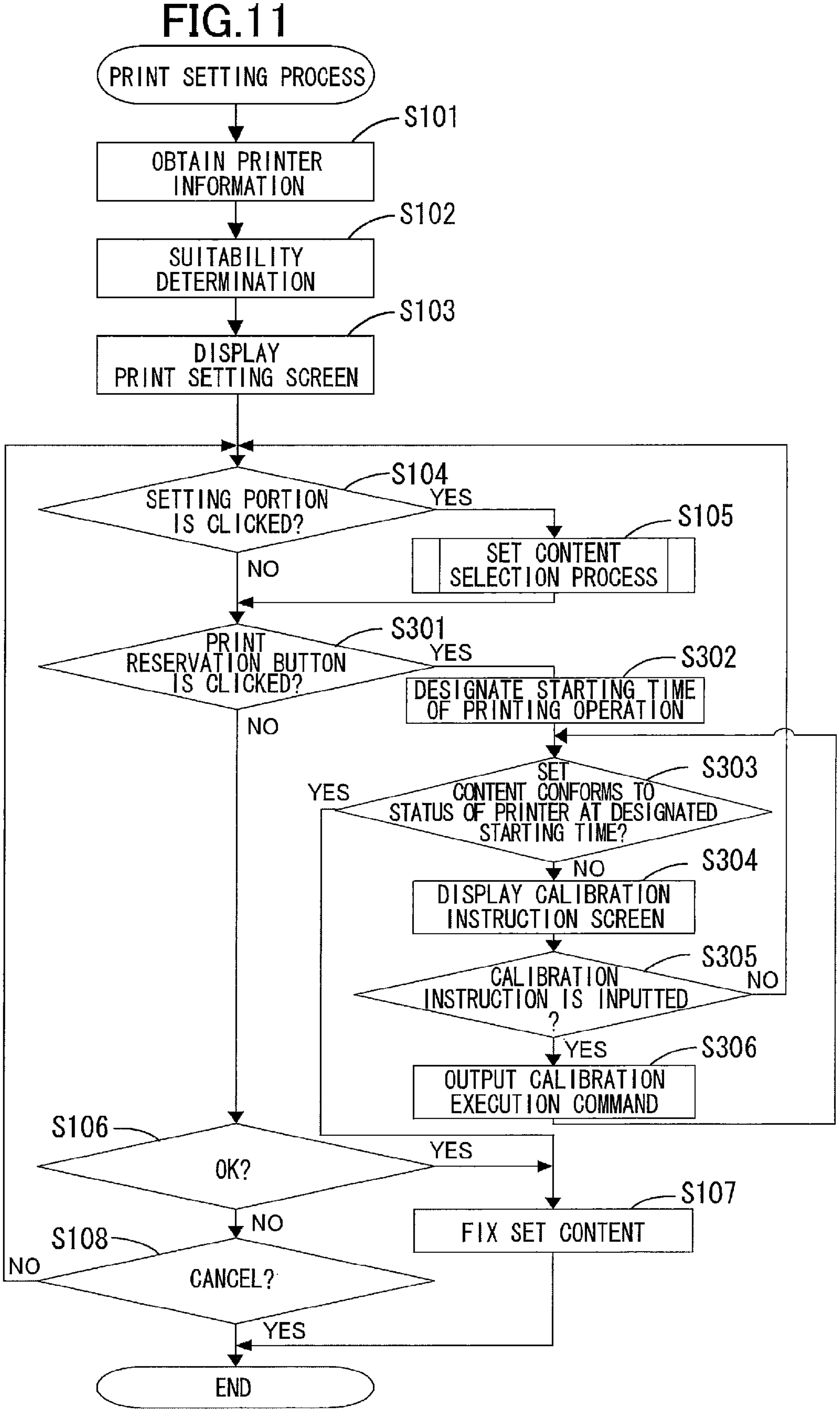
FIG. 11 is a flowchart illustrating steps in a print setting process according to a second embodiment of the present invention.
Figure 13:
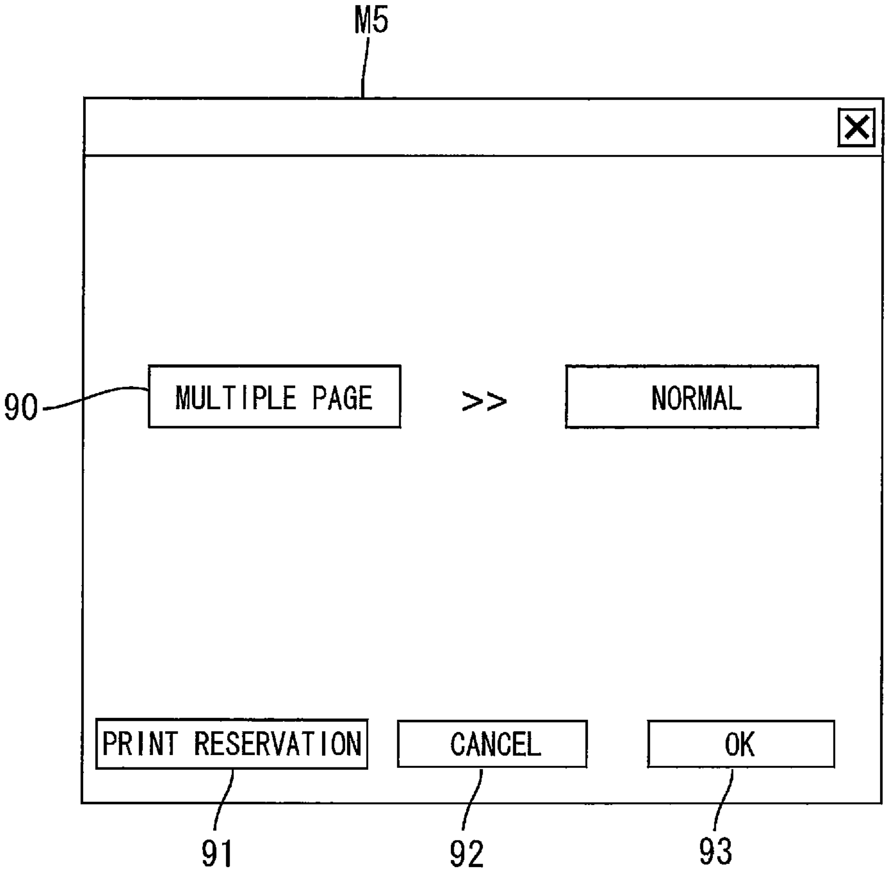
FIG. 13 is an explanatory diagram showing a print setting screen according to the second embodiment.

Next, a second embodiment of the present invention will be described while referring to FIGS. 11 through 15. FIG. 11 is a flowchart illustrating steps in a print setting process according to the second embodiment. The print setting process shown in FIG. 11 partially differs from the print setting process shown in FIG. 4. Since steps S101~S108 in FIG. 11 are the same as those in FIG. 4, detailed description thereof will be omitted. The configurations of the printer 1 and the computer 60 according to the second embodiment are the same as that of the printer 1 and the computer 60 according to the first embodiment.

Upon staring the print setting process shown in FIG. 11, in S101 the CPU 61 obtains, as printer information, an elapsed time after a most recent calibration process was executed. In this embodiment, the elapsed time since the most recent calibration process was executed is stored in the NVRAM 43 as the printer information. Subsequently, in S102 the CPU 61 executes the suitability determination based on the obtained printer information. In this embodiment, in the suitability determination, the CPU 61 determines whether a set content of a multiple page printing function (reduced printing function) for printing multiple pages of contents on one sheet is the suitable set content suitable for the status of the printer 1 or the unsuitable set content unsuitable for the status of the printer 1.

FIG. 12 is a table showing a relationship between a plurality of set contents of the multiple page printing function and the elapsed times. As shown in FIG. 12, the set contents of the multiple page printing function includes "Normal" for printing one page of content on one sheet, "2-in-1" for printing two pages of content on one sheet, "4-in-1", "9-in-1", "16-in-1", and "25-in-1". The lower the set content is listed in the table in FIG. 12, the greater the reduction ratio. In other words, the lower the set content, the smaller the magnification ratio of the image. The magnification ratio indicates a ratio of a printed size of an image to an original size of the image.

As the reduction ratio corresponding to the set content of the multiple page printing function becomes greater, the set content of the multiple page printing function is more likely to be determined as the unsuitable set content. That is, the printed image becomes smaller with increasing the reduction ratio and it makes the printed image harder to understand (harder to read the characters). Hence, since the printed image of high quality needs to be ensured by inhibiting the deviations of the printing positions and the deviations of the density levels, the set content of the multiple page printing function with the greater reduction ratio is determined as the unsuitable set content.

Further, as the elapsed time after the most recent calibration process was executed becomes longer, the set content of the multiple page printing function is more likely to be determined as the unsuitable set content. This is because the deviations of printing positions and density levels are increased over time.

Next, in S103 the CPU 61 displays a print setting screen M5 on the display unit 66. The print setting screen M5 includes a multiple page setting portion 90 for setting the multiple page printing, a print reservation button 91 for executing a printing operation at a designated starting time, an OK button 92, and a cancel button 93. Note that, the print setting screen M5 may include another setting items not to be used for the suitability determination. For the sake of simplicity, however, the another setting items are omitted.

Figure 7:
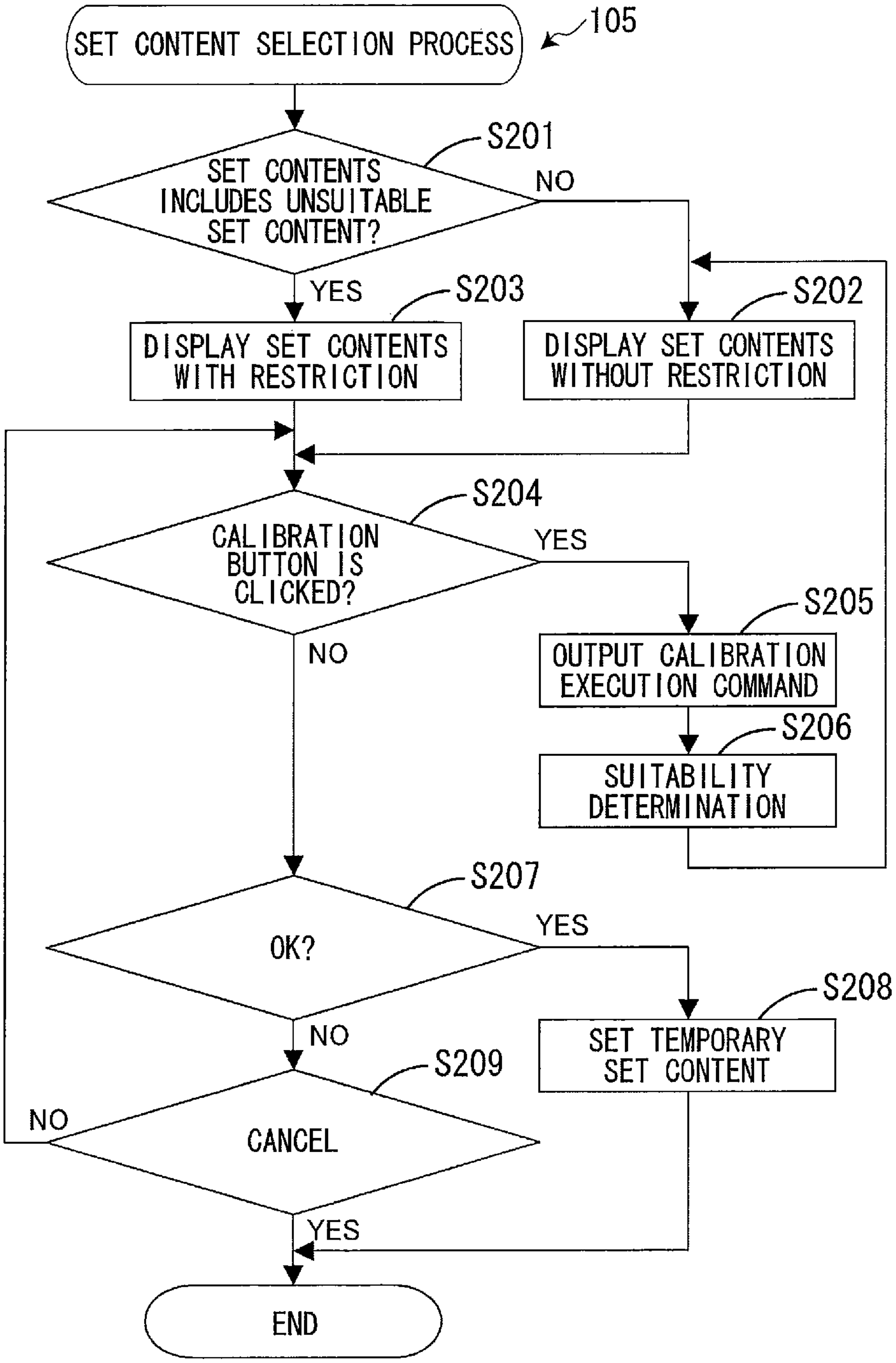
FIG. 7 is a flowchart illustrating steps in a set content selection process according to the first embodiment.

Subsequently, in S104 the CPU 61 determines whether or not the multiple page setting portion 91 is clicked. If the CPU 61 determines that the multiple page setting portion 91 is clicked (S104: Yes), in S105 the CPU 61 executes the set content selection process. The set content selection process in this embodiment is similar to the set content selection process shown in FIG. 7. In other words, the CPU 61 determines whether or not the set content of the multiple page printing function is suitable for the status of printer 1. When the CPU 61 determines that the set content of the multiple page printing function is the unsuitable set content (S201: Yes), in S203 the CPU 61 displays a selection screen M6 shown in FIG. 14. The selection screen M6 includes a selection portion 95, a calibration button 96, an OK button 97, and a cancel button 98.

Figure 14:
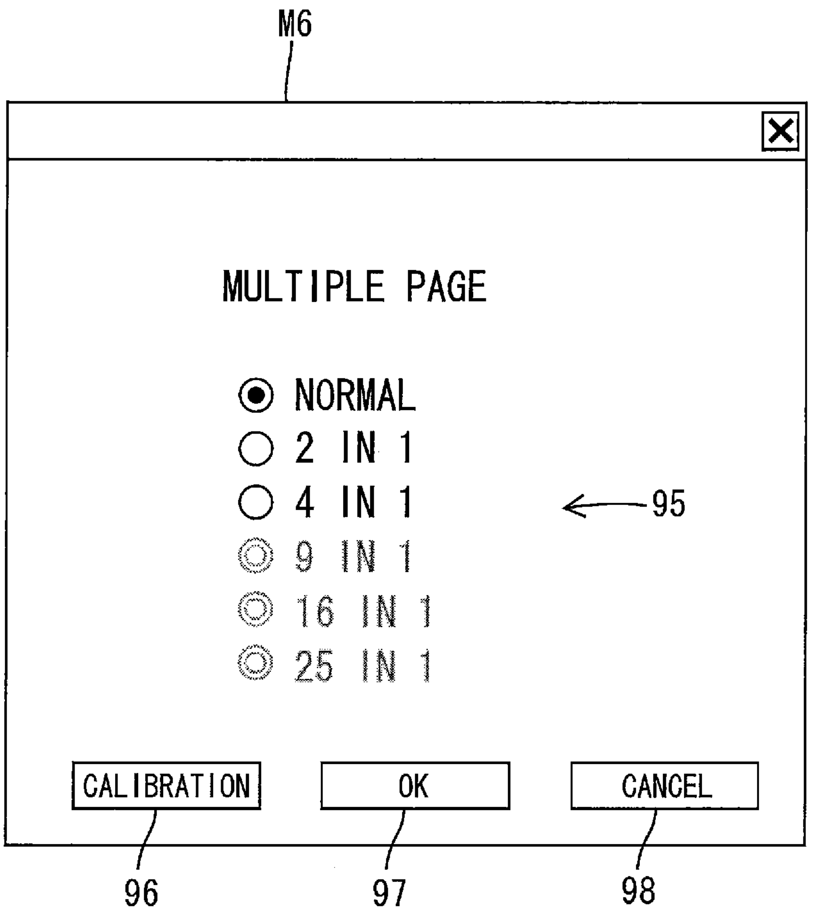
FIG. 14 is an explanatory diagram showing a setting screen according to the second embodiment.
Figure 15:
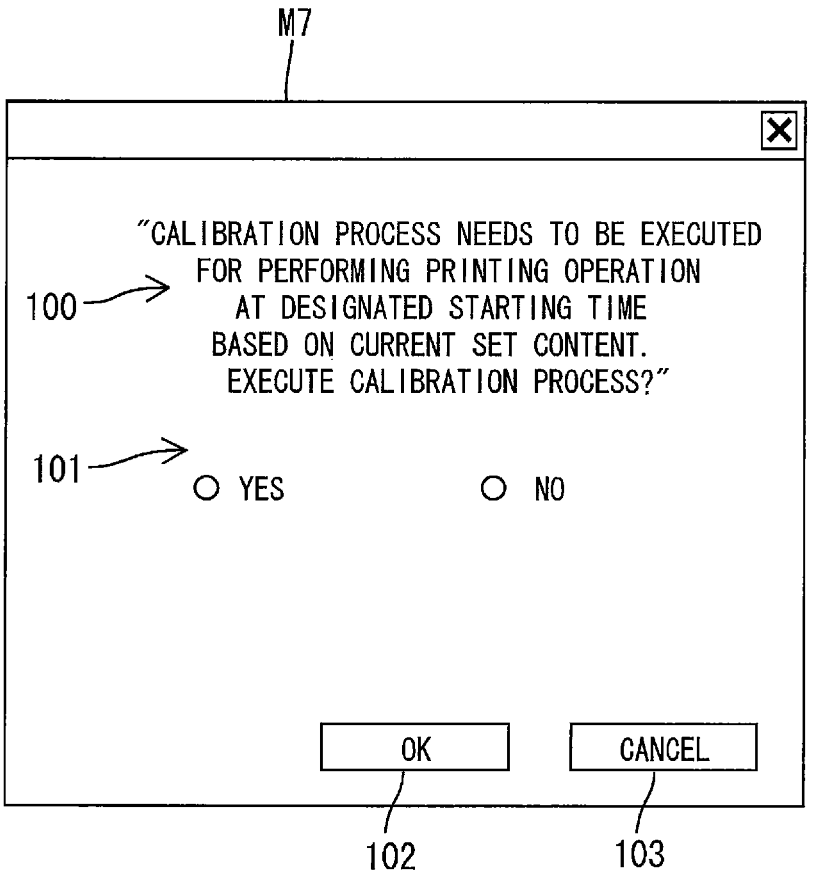
FIG. 15 is an explanatory diagram showing a calibration instruction screen according to the second embodiment.

Each set content of the multiple page printing function is displayed in the selection portion 95. As shown in FIG. 14, "Normal", "2-in-1", and "4-in-1" are displayed in user-selectable state as the suitable set contents and "9-in-1", "16-in-1", and "25-in-1" are displayed in user-unselectable state as the unsuitable set contents. That is, the "9-in-1", the "16-in-1", and the "25-in-1" are displayed in grayout and an outlined white circle is displayed in each radio button for the set contents.

Since S204~S209 in this embodiment are identical to those of the first embodiment, detailed description are omitted. After the end of the set content selection process, the CPU 61 redisplays the print setting screen M5 on the display unit 66 and displays a temporary set content set in the set content selection process in the multiple page setting portion 90. If the print reservation button 91 in the print setting screen M5 is clicked (S301: Yes), in S302 the CPU 61 displays a reservation screen (not shown) on the display unit 66. In the reservation screen, the user can designate a starting time of a printing operation. On the other hand, if the print reservation button 91 in the print setting screen M5 is not clicked (S301: No), the CPU 61 advances to S106.

Subsequently, in S303 the CPU 61 determine whether or not the temporary set content in the multiple page setting portion 90 is suitable for the status of the printer 1 at the designated starting time that has been set in the reservation screen. More specifically, the CPU 61 determines whether the temporary set content is the suitable set content or the unsuitable set content based on an elapsed time and the table shown in FIG. 12. The elapsed time indicates a period of time from the execution of the most recent calibration process until the designated starting time if a calibration process is not executed until the designated starting time.

If the temporary set content is determined as the suitable set content (S303: Yes), in S107 the CPU 61 fixes the temporary set content of the multiple page setting portion 90 as a fixed set content and ends the print setting process. On the other hand, if the temporary set content is determined as the unsuitable set content (S303: No), in S304 the CPU 61 displays a calibration instruction screen M7 shown in FIG. 15 on the display unit 66.

The calibration instruction screen M7 includes a message display portion 100, a selection portion 101, an OK button 102, and a cancel button 103. A message "Calibration process needs to be executed for performing a printing operation at designated starting time based on current set content. Execute calibration process?" is displayed in the message display portion 100. "YES" or "NO" can be selected on the selection portion 101.

If the user selects "YES" in the section portion 101 and clicks the OK button 102 (S305: Yes), in S306 the CPU 61 transmits the calibration execution command to the printer 1. The CPU 40 of the printer 1 executes the calibration process for the print characteristics upon receipt of the calibration execution command. At this time, the CPU 41 resets the elapsed time stored in the NVRAM 43 to update the printer information.

Subsequently, the CPU 61 returns to S303 and reruns the suitability determination. That is, the CPU 61 determine whether or not the temporary set content in the multiple page setting portion 90 is suitable for the status of the printer 1 at the designated starting time. Then, if the temporary set content is determined as the suitable set content (S303: Yes), in S107 the CPU 61 fixes the temporary set content of the multiple page setting portion 90 as a fixed set content and ends the print setting process.

Thereafter, when the OK button 72 of the print instruction screen M1 is clicked, the CPU 61 transmits, to the printer 1, print data including image data to be printed, data indicating the designated starting time and the fixed set content of the multiple page printing function. The CPU 40 of the printer 1 executes a printing operation at the designated starting time if the received print data includes the data indicating the designated starting time.

Since the printer 1 executes the calibration process after having received the calibration execution command, the set content for the reserved printing operation is suitable for the status of the printer 1 at the designated starting time. Therefore, the user can obtain an image of desired quality without changing the set content of the multiple page printing function.

If the user selects "NO" in the section portion 101 and clicks the OK button 102 or the cancel button 103 is clicked (S305: No), the CPU 61 returns to S104. Hence, the user can change the set content of the multiple page printing function in the print setting screen M5 and try to reserve a printing operation again.

According to the second embodiment described above, the CPU 61 determines the suitability determination based on the status change of the printer 1 that is expected in the designated starting time. Accordingly, an image printed by a reserved printing operation can be prevented from having improper quality.

The set content of the multiple page printing function having the relatively greater reduction ratio in a plurality of the set contents is preferentially determined as the unsuitable set content. That is, since the printed image becomes smaller as the selected reduction ratio is increased, the printed image with high quality is required. Therefore, since the set content of the multiple page printing function having the relatively greater reduction ratio is preferentially determined as the unsuitable set content, the printed image with the improper quality can be avoided.

MODIFICATIONS

While the invention has been described in detail with reference to the embodiment thereof, it would be apparent to those skilled in the art that various changes and modifications may be made therein without departing from the spirit of the invention.

(1) In the embodiments described above, while a print setting is performed on the computer that is connected to the printer, the print setting may be performed on the printer. For example, in the printer 1 shown in FIG. 1, the display unit 45 and the operation unit 46 may be used as a user interface and the CPU 40 may execute a process for obtaining the status change of the printer 1, a process for executing the suitability determination for the set content, and at least one of two processed including a process for restricting the set content, which is determined as the unsuitable set content, from being used for a printing operation and a process for allowing a user to distinguish the set content, which is determined as the unsuitable set content, from another set content in the plurality of set contents which is determined as the suitable set content in the user interface.

(2) In the embodiments described above, the printer 1 is not limited to an electrophotographic color printer. A monochromatic printing device, an inkjet printing device, or different type of printing device having a function for calibrating deviations of printing positions and deviations of the density levels are available.

(3) In the embodiments described above, the unsuitable setting is restricted from being used for the printing operation. However, if the user can distinguish the suitable set content from the unsuitable set content in the user interface, the unsuitable setting may not be restricted from being used for the printing operation. For example, in the selection screen M6 shown in FIG. 14, the unsuitable setting may be selected by the operation unit 65.

On the contrary, if the unsuitable setting is restricted from being used for the printing operation, the user may not distinguish the suitable set content from the unsuitable set content in the user interface. For example, if the user selects the unsuitable set content and instructs a printing operation based on the selected unsuitable set content, the printer 1 may be configured so as not to perform the instructed printing operation.

(4) In the embodiments described above, while the unsuitable set content is displayed in grayout and an outlined white circle is displayed in the radio button for the unsuitable set content, a method for differentiating the suitable set content and the unsuitable set content may be changed by the user interface. For example, a display color for the unsuitable set content may be different from a display color for the suitable set content. Further, when the user selects the unsuitable set content, a message may be displayed and an alarm sound (beep sound) may be emitted from a speaker. The message indicates that the printed image may not have desired quality or it is preferable to execute a calibration process.

(5) In this application, the specific setting item for the suitability determination may be changed arbitrarily. For example, a color number (tone) may be used as a specific setting item in place of the color/monochrome. In this case, the color number setting may include "2 bit", "8 bit", and "16 bit" as set contents for the suitability determination. As the color number increases, the printed image with high quality is required. Therefore, the set content of the color number is preferentially determined as the unsuitable set content with increasing the color number, thereby avoiding the printed image with the improper quality.

In the embodiments described above, while the user selects one set content from a plurality of set contents of the specific setting item, the user may input a numerical value for the set content of the specific setting item through an operation unit. For example, a numerical value may be inputted as a reduction ratio of an image. It may be determined whether or not the numerical value conforms to a status of a printer.

(6) If the set contents of the specific setting item includes the unsuitable set content or the user selects the unsuitable set content, a user interface may be capable of instructing an alternate print for printing image data on another printer. For example, an alternate print button may be provided on the selection screen M4 shown in FIG. 9. When the user clicks the alternate print button, another printers connected to the network interface 67 and whose printer drivers are installed in the computer may be displayed to execute the alternate print on a user-selected printer in the another printers.

(7) In the embodiments described above, while the calibration process is performed when the user sets a print condition, the calibration process may be performed based on an instruction from the user at any time other than the time for setting the print condition. Further, the calibration process may be automatically performed when satisfying a predetermined condition. Furthermore, the calibration process may be forcibly performed when the suitable set content is selected.

(8) In the embodiments described above, the deviations of the printing positions among four colors are calibrated in the calibration process. However, a periodical deviation of a printing position arising from a nonuniform rotation of a photosensitive drum or another rotatable member may be detected to calibrate the periodical deviation in the calibration process. Further, the deviations of the density levels may be detected and calibrated in the calibration process. Furthermore, in the calibration process, a pattern including a plurality of marks may be printed on a recording paper to detect a position of the pattern by a sensor. Alternatively, the user may read off the deviations of the printing positions from the printed pattern on the recording paper and input the result in a printer. Further, in the calibration process, various types of calibration process may be simultaneously performed.

(9) In the embodiments described above, the number of sheets that has been printed or the elapsed time after the most recent calibration process was executed is obtained as information indicating the status change of a printer. However, the obtained information may be changed arbitrarily. For example, by detecting a temperature or humidity of the printer, a temperature or humidity change after the most recent calibration process was executed may be obtained as the information. Alternatively, by detecting the opening and closing movement of the cover 2A or a replacement of a cartridge or the like, the detected results may be obtained as the information.

What is claimed is:

1. A print setting apparatus comprising:

a user interface that is configured to receive a user instruction when a user sets a print condition for a printer, at least one setting item that includes a plurality of set contents, being set for the print condition; and a control device configured to perform:

executing a calibration process for calibrating print characteristic;

obtaining a status of the printer indicating a status change of the printer depending on the calibration process, each of the plurality of set contents being a suitable set content suitable for the status of the printer or an unsuitable set content unsuitable for the status of the printer;

determining whether a set content set for the one setting item is the suitable set content or the unsuitable set content based on the obtained status of the printer indicating the status change of the printer depending on the calibration process, and based on a table that correlates the plurality of set contents with one of the suitable set content and the unsuitable set content for the status change;

executing at least one of a process for restricting the set content, which is determined as the unsuitable set content, from being used for a printing operation and a process for displaying a determination result in the user interface in a manner to distinguish the set content, which is determined as the unsuitable set content, from another set content in the plurality of set contents which is determined as the suitable set content in the user interface; and receiving a calibration execution command to execute the calibration process in the printer through the user interface if the control device determines the set content set for the one setting item is the unsuitable set content.

2. The print setting apparatus according to claim 1, wherein, if the control device determines that the set content is the suitable set content, the printer is in the status where the printer is capable of printing an image with quality satisfying the set content, wherein, if the control device determines that the set content is the unsuitable set content, the printer is in the status where the printer is not capable of printing an image with quality satisfying the set content.

3. The print setting apparatus according to claim 1, wherein, after the calibration process was executed in the printer in response to the calibration execution command, the control device is configured to change the determination of the set content from the unsuitable set content to the suitable set content.

4. The print setting apparatus according to claim 1, wherein a plurality of setting items is configured to be set through the user interface, each of the plurality of setting items having a plurality of set contents, and wherein the control device is configured to determine whether or not a combination of set contents set for the plurality of setting items is suitable for the status of the printer.

5. The print setting apparatus according to claim 1, wherein a starting time of a printing operation in the printer is configured to be designated through the user interface, and wherein the control device is configured to determine whether or not the set content is suitable for another status of the printer at the designated starting time.

6. The print setting apparatus according to claim 1, wherein the one setting item is an image resolution having the plurality of set contents for the image resolution, and wherein the set content having higher resolution in the plurality of set contents is preferentially determined as the unsuitable set content by the control device.

7. The print setting apparatus according to claim 1, wherein the one setting item is a reduction ratio having the plurality of set contents for the reduction ratio, and wherein the set content having greater reduction ratio in the plurality of set contents is preferentially determined as the unsuitable set content by the control device.

8. The print setting apparatus according to claim 1, wherein the status change includes one of an elapsed time after a most recent calibration process was executed, number of printed sheets after the most recent calibration process was executed, and a replacement of a part after the most recent calibration process was executed.

9. A non-transitory computer readable storage medium storing a set of program instructions installed on and executed by a computer for setting a print condition for a printer including a user interface configured to receive a user instruction when a user sets the print condition, at least one setting item that includes a plurality of set contents, being set for the print condition, the set of program instructions comprising:

executing a calibration process for calibrating print characteristic;

obtaining a status of the printer indicating a status change of the printer depending on the calibration process, each of the plurality of set contents being a suitable set content suitable for the status of the printer or an unsuitable set content unsuitable for the status of the printer;

determining whether a set content set for the one setting item is the suitable set content or the unsuitable set content based on the obtained status of the printer indicating the status change of the printer depending on the calibration process, and based on a table that correlates the plurality of set contents with one of the suitable set content and the unsuitable set content for the status change;

executing at least one of a process for restricting the set content, which is determined as the unsuitable set content, from being used for a printing operation and a process displaying a determination result by the determining in the user interface in a manner to distinguish the set content, which is determined as the unsuitable set content, from another set content in the plurality of set contents which is determined as the suitable set content in the user interface; and receiving, through the user interface, a calibration execution command to execute the calibration process in the printer if the determining determines the set content set for the one setting item is the unsuitable set content.

10. A print setting method for setting a print condition for a printer including a user interface configured to receive a user instruction when a user sets the print condition, at least one setting item that includes a plurality of set contents, being set for the print condition, the print setting method comprising:

executing a calibration process for calibrating print characteristic;

obtaining a status of the printer indicating a status change of the printer depending on the calibration process, each of the plurality of set contents being a suitable set content suitable for the status of the printer or an unsuitable set content unsuitable for the status of the printer;

determining whether a set content set for the one setting item is the suitable set content or the unsuitable set content based on the obtained status of the printer indicating the status change of the printer depending on the calibration process, and based on a table that correlates the plurality of set contents with one of the suitable set content and the unsuitable set content for the status change; and executing at least one of a process for restricting the set content, which is determined as the unsuitable set content, from being used for a printing operation and a process displaying a determination result by the determining in the user interface in a manner to distinguish the set content, which is determined as the unsuitable set content, from another set content in the plurality of set contents which is determined as the suitable set content in the user interface, receiving, through the user interface, a calibration execution command to execute the calibration process in the printer if the determining determines the set content set for the one setting item is the unsuitable set content.

11. A printer comprising:

a user interface that is configured to receive a user instruction when a user sets a print condition for a printer, at least one setting item that includes a plurality of set contents, being set for the print condition; and a control device configured to perform:

executing a calibration process of print characteristic;

obtaining a status change of the printer depending on the calibration process, each of the plurality of set contents being a suitable set content suitable for the status of the printer or an unsuitable set content unsuitable for the status of the printer;

determining whether a set content set for the one setting item is the suitable set content or the unsuitable set content based on the obtained status change of the printer indicating the status change of the printer depending on the calibration process, and based on a table that correlates the plurality of set contents with one of the suitable set content and the unsuitable set content for the status change;

executing at least one of a process for restricting the set content, which is determined as the unsuitable set content from being used for a printing operation and a process for displaying a determination result in the user interface in a manner to distinguish the set content, which is determined as the unsuitable set content, from another set content in the plurality of set contents which is determined as the suitable set content in the user interface; and receiving a calibration execution command to execute the calibration process in the printer through the user interface if the control device determines the set content set for the one setting item is the unsuitable set content.

* * * * *